United States Patent
Köffers et al.

(10) Patent No.: US 12,097,974 B2
(45) Date of Patent: Sep. 24, 2024

(54) METHOD FOR PRODUCING A STRUCTURAL COMPONENT

(71) Applicant: Siempelkamp Maschinen- und Anlagenbau GmbH, Krefeld (DE)

(72) Inventors: Fabian Köffers, Krefeld (DE); Michael Schöler, Rheurdt (DE); Klaus Schürmann, Jüchen (DE); Lothar Sebastian, Duisburg (DE)

(73) Assignee: Siempelkan Maschinen- und Anlagenbau GmbH, Krefeld (DE)

( * ) Notice: Subject to any disclaimer, the term of this patent is extended or adjusted under 35 U.S.C. 154(b) by 0 days.

(21) Appl. No.: 17/636,636

(22) PCT Filed: Jul. 29, 2020

(86) PCT No.: PCT/EP2020/071405
§ 371 (c)(1),
(2) Date: Feb. 18, 2022

(87) PCT Pub. No.: WO2021/032428
PCT Pub. Date: Feb. 25, 2021

(65) Prior Publication Data
US 2022/0281185 A1    Sep. 8, 2022

(30) Foreign Application Priority Data

Aug. 22, 2019 (DE) ............ 10 2019 005 908.5

(51) Int. Cl.
*B29C 70/44* (2006.01)
*B29C 43/18* (2006.01)
(Continued)

(52) U.S. Cl.
CPC ............... *B64F 5/10* (2017.01); *B29C 43/18* (2013.01); *B29C 70/44* (2013.01); *B29C 70/46* (2013.01);
(Continued)

(58) Field of Classification Search
CPC ...... B29C 70/44; B29C 70/46; B32B 37/1009
(Continued)

(56) References Cited

U.S. PATENT DOCUMENTS 3,912,542 A * 10/1975 Hirano ............. B32B 17/10844
156/286
4,338,070 A * 7/1982 Nava ...................... A42B 3/063
425/417
(Continued)

FOREIGN PATENT DOCUMENTS

CN    203110205    8/2013
DE    693 08 471   9/1997
(Continued)

OTHER PUBLICATIONS

Machine Translation of DE102017107524 (original cited in IDS) (Year: 2017).*
(Continued)

*Primary Examiner* — Scott W Dodds
(74) *Attorney, Agent, or Firm* — GREENBLUM & BERNSTEIN, P.L.C.

(57) ABSTRACT

A method is specified for producing a structural component, in particular for an aircraft, ground vehicle, or watercraft, or for a rotor blade of a wind turbine, in which method an arrangement of fibers and plastic material is laid in a mold and subjected to an increased pressure and an increased temperature, wherein a mold is used which comprises at least one recess in which a reinforcing element is arranged. The object is to be able to cost-effectively produce a structural component of this type. For this purpose, it is provided that the reinforcing element is laid in the recess together with a core, wherein a differential volume between the recess and core, at least in a predetermined region, is chosen such that it is smaller than a segment of the rein-
(Continued)

forcing element arranged in said region by a predetermined amount.

13 Claims, 1 Drawing Sheet

(51) Int. Cl.
| | |
|---|---|
| *B29C 70/46* | (2006.01) |
| *B64F 5/10* | (2017.01) |
| *B29C 35/04* | (2006.01) |
| *B29C 43/32* | (2006.01) |
| *B29L 31/08* | (2006.01) |
| *B29L 31/30* | (2006.01) |
| *B32B 37/06* | (2006.01) |
| *B32B 37/10* | (2006.01) |

(52) U.S. Cl.
CPC .. *B29C 2035/043* (2013.01); *B29C 2043/189* (2013.01); *B29C 2043/3261* (2013.01); *B29L 2031/085* (2013.01); *B29L 2031/30* (2013.01); *B32B 37/06* (2013.01); *B32B 37/10* (2013.01)

(58) Field of Classification Search
USPC ...................................................... 156/583.3
See application file for complete search history.

(56) References Cited

U.S. PATENT DOCUMENTS

| | | | | |
|---|---|---|---|---|
| 5,354,195 | A | * | 10/1994 | Dublinski ........... B29C 43/3642 428/116 |
| 5,725,940 | A | * | 3/1998 | Sakai .................... B29C 70/865 428/318.6 |
| 9,067,345 | B2 | | 6/2015 | Hanke et al. |
| 2011/0148054 | A1 | * | 6/2011 | Davis ....................... A63C 1/32 280/11.3 |
| 2013/0234373 | A1 | | 9/2013 | Zuardy et al. |
| 2013/0256941 | A1 | * | 10/2013 | Buehlmeyer ......... B29C 70/461 425/384 |
| 2020/0130291 | A1 | * | 4/2020 | Heath, III ........... B29C 43/3642 |

FOREIGN PATENT DOCUMENTS

| | | |
|---|---|---|
| DE | 10 2010 035 493 | 3/2012 |
| DE | 10 2016 211 255 | 12/2017 |
| DE | 10 2017 107 524 | 10/2018 |
| DE | 10 2017 113 595 | 12/2018 |
| EP | 3 233 444 | 10/2017 |
| JP | 2007-90764 | 4/2007 |

OTHER PUBLICATIONS

Geman Search Report/Office Action conducted in counterpart German Appln. No. 10 2019 005 908.5 (Nov. 30, 2022).
Int'l Search Report (form PCT/ISA/210) conducted in Int'l Appln. No. PCT/EP2020/071405 (Nov. 4, 2020).
Int'l Written Opinion (form PCT/ISA/237) conducted in Int'l Appln. No. PCT/EP2020/071405 (Nov. 4, 2020).
China Search Report/Office Action conducted in counterpart China Appln. No. 202080054936.1 (Jan. 16, 2024).
China Search Report/2nd Office Action conducted in counterpart China Appln. No. 202080054936.1 (May 24, 2024).
Zhang Jun et al., *Hydraulic Transmission*, China University of Mining and Technology Press, p. 75 (Sep. 30, 2015).

* cited by examiner

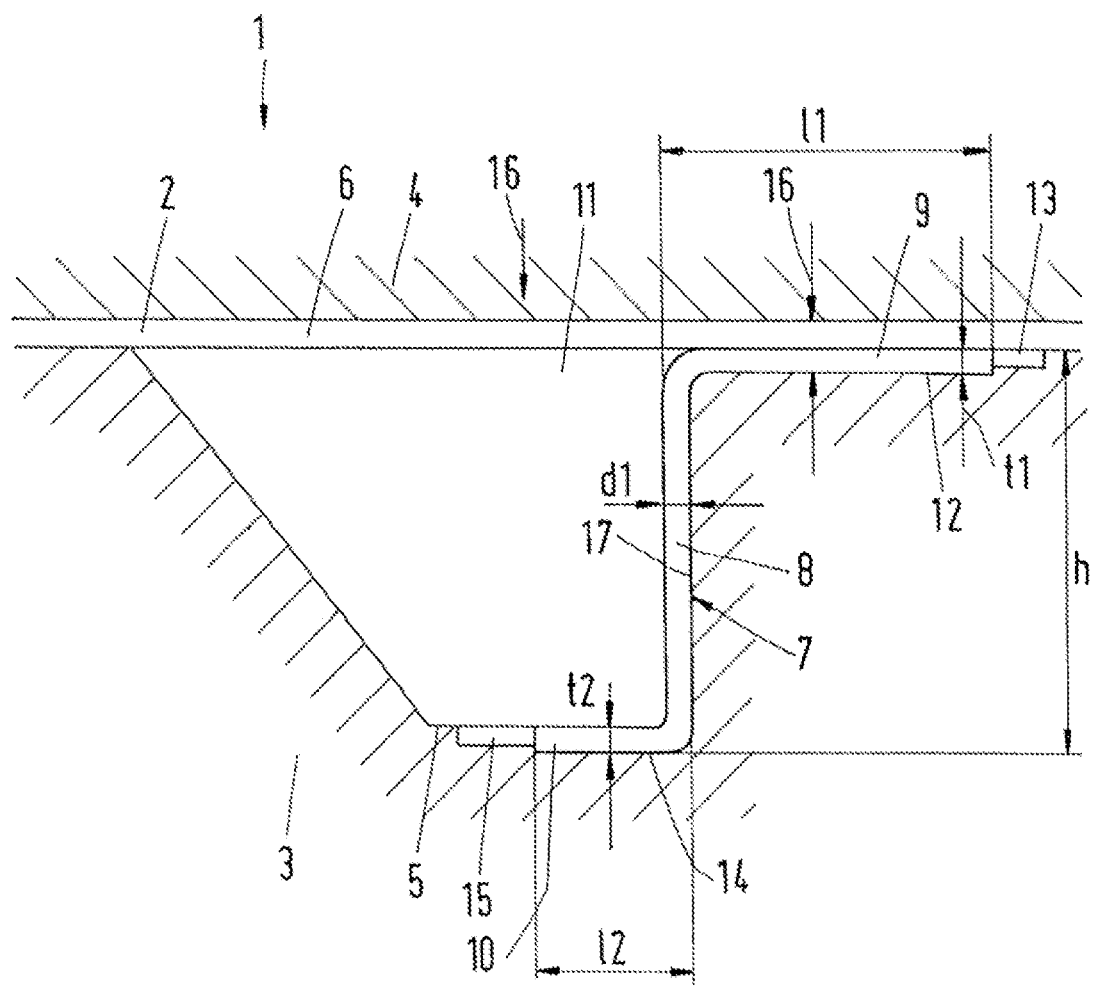

METHOD FOR PRODUCING A STRUCTURAL COMPONENT

The present invention relates to a method for producing a structural component, in particular for an aircraft, ground vehicle, or watercraft, or for a rotor blade of a wind turbine, in which method an arrangement of fibers and plastic material is laid in a mold and subjected to an increased pressure and an increased temperature, wherein a mold is used which comprises at least one recess in which a reinforcing element is arranged.

DE 693 08 471 T2 shows a molded body of composite material and a method for the production thereof. There, two multi-layer plates are connected to one another by applying a pressure and an increased temperature, wherein in one embodiment that relates to a bumper, one of the plates is provided with a channel into which a foamed body of propylene resin is stuffed. Before being stuffed in, this body has a volume that is larger than the volume of the channel of the main support. The front plate is arranged thereon.

Another method is known, for example, from DE 10 2017 113 595 A1.

U.S. Pat. No. 9,067,345 B2 shows a molding tool for producing fiber composite structural parts and a method for producing fiber composite structural parts using a molding tool of this type. In this case, a cavity is provided which is arranged opposite from the sprue line and parallel to the sprue line and can be filled with excess matrix material and, if necessary, foreign material and air.

The arrangement of fibers and plastic material subsequently forms the skin or wall of the structural component, which skin or wall is reinforced by the reinforcing element, which is also referred to as a "stringer". In particular, the reinforcing element serves to brace the structural component. The structural component can then be used as a body shell element or fuselage element for one of the vehicles noted. If the skin is embodied as a half-shell, for example, then two half-shells of this type can be assembled with an opposing orientation in order to construct a fuselage or a cabin of an aircraft.

If the arrangement of fibers and plastic material is subjected to an increased pressure and an increased temperature, then the plastic material fuses and forms a tight bond with the fibers. After the plastic material has cooled and solidified, a mechanically very stable structural component then results. But it is thereby of certain significance that a specific pressure is produced and maintained until the skin has cooled, which pressure acts not only on the arrangement of fibers and plastic material, but also on the reinforcing element.

At the same time, however, the ability to keep the costs for producing the structural component as small as possible is desired.

The object of the invention is to produce a structural component for an aircraft, ground vehicle, or watercraft with low costs.

This object is attained with a method of the type named at the outset in that the reinforcing element is laid in the recess together with a core, wherein a differential volume between the recess and core, at least in a predetermined region, is chosen such that it is smaller than a segment of the reinforcing element arranged in said region by a predetermined amount and the pressure is applied by a membrane which delimits an oil pressure chamber.

In the production of the structural component, stringers or reinforcing elements that are supplied as semi-finished product are often used for cost reasons. Reinforcing elements of this type have relatively large tolerances, meaning that the outer dimensions thereof differ markedly by multiples of a percent. A different or additional problem arises from differing thermal expansions between the working material and the material of the mold and/or of the core. Independent of the cause, this can lead to the pressure on the reinforcing element decreasing, or even being completely lost, while being applied to the arrangement of fibers and plastic material. If the arrangement of fibers and plastic material, which is hereinafter referred to in short as the "skin", is subjected to an increased temperature, this not only causes the plastic material of the skin to fuse. The increased temperature also propagates into the reinforcing element, so that the plastic material arranged there then also becomes soft and attains a viscous, syrup-like state. In this state, a certain pressure must be maintained in order to subsequently obtain a desired shape. If the cavity, that is, the differential volume between the recess and core, is chosen such that it is somewhat smaller than the reinforcing element, wherein this "smaller" can be limited to predetermined regions or at least one predetermined region of the reinforcing element, then the semi-finished product for the reinforcing element is slightly squashed. The viscous working material of the reinforcing element then causes the reinforcing element to be under a hydrostatic pressure. A uniform pressure distribution is thus achieved. The pressure can decrease slightly due to differing thermal expansion coefficients, but it does not drop to zero. The reinforcing element and the arrangement of fibers and plastic material are thus constantly under pressure.

The differential volume preferably comprises at least one displacement region outside of the predetermined segment. If at all possible, the pressure in the recess should not become too large. This can be achieved on the one hand in that the "smaller" of the differential volume is matched relatively exactly with the working material used for the reinforcing element. However, this is difficult with large tolerances of the reinforcing element. A displacement region can then be provided in which "excess plastic material" of the reinforcing element can be displaced. However, the displacement region does not necessarily need to be capable of accommodating the entire excessive volume of the reinforcing element. It is by all means acceptable that a small portion of the volume of the reinforcing element remains in the region of the arrangement of fibers and plastic material and causes a small swelling there.

Preferably, at least one displacement region is arranged on a side of the reinforcing element that faces away from the arrangement of fibers and plastic material. When an increased temperature and an increased pressure are applied, at least the pressure acts on the reinforcing element from the side of the arrangement of fibers and plastic material. A certain amount of time passes before the increased temperature propagates to the end facing the other way. During this time, the plastic material of the reinforcing element can, of course, become viscous. But it can also divert into the displacement region, though in this case it must pass by a portion of the reinforcing element, which thus forms, in a manner of speaking, a throttle which maintains the pressure in the recess.

Preferably, the displacement region is connected to the predetermined segment via a throttle point. This throttle point can simply be a transverse constriction. It permits a diversion of the plastic material of the reinforcing element into the displacement region, but maintains a pressure in the remaining differential volume.

Preferably, the reinforcing element has a height, and the recess has a depth that is smaller than the height. The height of the reinforcing element is the dimension perpendicular to the arrangement of fibers and plastic material. If the recess is slightly less deep than this height, then the reinforcing element is compressed when the increased pressure is applied.

Alternatively or additionally, a reinforcing element can be used which comprises a web protruding away from the arrangement of fibers and plastic material, and a distance between the core and a wall of the recess in the region of the web is smaller than a thickness of the web. In an application of an increased pressure and an increased temperature to the arrangement of fibers and plastic material, the core is then pressed into the recess and exerts a pressure on the web.

Preferably, a reinforcing element can be used which comprises at least a first leg that bears against the arrangement of fibers and plastic material, wherein the recess has a first subregion for accommodating the first leg and the first subregion has a depth that is smaller than a thickness of the first leg. Here, the same applies as for the web. When the arrangement of fibers and plastic material is subjected to an increased pressure and an increased temperature, the leg is compressed, that is, subjected to pressure, in its thickness direction.

Here, it is preferred that the first subregion comprises a first extension in a direction parallel to the arrangement of fibers and plastic material, which extension extends a length of the first subregion beyond the length of the first leg, wherein the first extension has a depth that is smaller than the depth of the first subregion outside of the extension. The extension then forms a displacement volume. Because the extension has a depth that is smaller than the depth of the first subregion outside of the extension, the aforementioned throttle point is present here, which throttle point permits an advancement of an excess amount of plastic material of the reinforcing element, but opposes said advancement with a certain resistance, so that the hydrostatic pressure that acts on the reinforcing element continues to be maintained.

Preferably, a reinforcing element is used which comprises a second leg at an end facing away from the first leg, wherein the recess comprises a second subregion for accommodating the second leg and the second subregion has a depth that is smaller than a thickness of the second leg. Here, the same applies as for the first leg.

It can also be provided here that the second subregion comprises a second extension in a direction parallel to the arrangement of fibers and plastic material, which extension extends a length of the second subregion beyond the length of the second leg, wherein the second extension has a depth that is smaller than a depth of the second subregion outside of the extension.

To carry out a method of this type, a mold can be used, for example, into which prepregs are laid. Unidirectional prepregs, for example, can be used as prepregs, that is, prepregs in which carbon fibers or other reinforcing fibers, such as glass fibers for example, all run in the same direction. Alternatively, prepregs can also be used in which reinforcing fibers are arranged in different directions, wherein a separate fiber layer is preferably provided for each direction. In order to arrange reinforcing fibers in different directions, it is also possible to arrange multiple unidirectional prepregs on top of one another and specify a corresponding direction of the reinforcing fibers using the orientation of the prepregs.

In a prepreg, the reinforcing fibers are pre-impregnated with a plastic material. In this case, a thermoplastic material, in particular polyamide, for example PA6, is preferably used.

For the application of the increased temperature and the increased pressure, a membrane which delimits an oil pressure chamber is used, for example. Oil can then be fed into the oil pressure chamber, for example, at an increased temperature, for example in a range of 350° C. to 410° C. The oil can also be used, for example, to lower the temperature again following the heating, in that the temperature of the oil is cooled, for example, to a temperature range of 20° to 40° C., in particular 30° C., for example.

The laying of the prepregs can be carried out with the aid of tape layers, for example.

The invention is described below on the basis of a preferred exemplary embodiment in connection with the drawing. Here:

The sole FIGURE shows a schematic illustration of a mold for producing a structural component.

A mold 1 for producing a merely schematically illustrated structural component 2 comprises a lower die 3 and an upper die 4. The lower die 3 comprises a recess 5.

To produce the structural component, an arrangement 6 of fibers and plastic material is laid into the lower die 3. The arrangement 6 is preferably formed by what are referred to as prepregs, in which a plastic material has already been applied to fibers. Carbon fibers or other high-tensile fibers can preferably be used as fibers. A thermoplastic material, in particular polyamide, for example PA6, is preferably used as plastic material.

The fibers of the prepregs can be arranged unidirectionally, that is, such that they all run in the same direction. It is also possible, however, to use prepregs in which multiple fiber layers are present, the fibers of which run in different directions. It is also possible to use unidirectional prepregs, that is, prepregs in which all fibers run in the same direction, and to arrange multiple prepregs of this type in different directions in the lower die 3. The fiber direction is determined by the subsequently desired load-bearing capacity of the structural component 2. For example, a fuselage or a cabin of an aircraft, ground vehicle, or watercraft can be produced from the structural component 2.

The FIGURE shows a mold 1 in which the structural component obtains an essentially flat formation. However, the mold 1 can also be embodied such that shapes which are at least slightly rounded can be produced, for example for an engine cover. The mold 1 can also be embodied such that shell-like structural components 2 can be produced.

The aforementioned prepregs can be laid in the mold 1 by hand or by tape layers. The thickness of the structural component 2 can be set by using more or fewer prepregs.

In addition, a reinforcing element 7 is laid in the recess, which reinforcing element 7 is in the present case embodied in a Z shape and comprises a web 8 which projects essentially perpendicularly from the arrangement 6 of fibers and plastic material. The reinforcing element 7 comprises a first leg 9 that bears against the arrangement 6 of fibers and plastic material and a second leg 10 at the other end of the reinforcing element 7.

The reinforcing element 7 is laid in the recess 5 together with a core 11.

The recess 5 comprises a first subregion 12 for accommodating the first leg 9. The first subregion 12 comprises a first extension 13 that extends a length 11 of the first subregion beyond the length of the first leg 9. However, the first extension 13 has a depth that is smaller than a depth t1 of the first subregion 12 outside of the extension 13.

The recess 5 additionally comprises a second subregion 14 for accommodating the second leg 10. The second subregion 14 comprises an extension 15 that extends a length 12 of the second subregion 14 beyond the length of the second leg 10. The second extension 15 has a depth that is smaller than a depth t2 of the second subregion 14 outside of the extension.

The core 11 has a volume that is smaller than the volume of the recess 5. Accordingly, when the core 11 has been laid in the recess 5, a differential volume or a cavity results. Theoretically, this differential volume should be identical to the volume of the reinforcing element 7.

However, one departs from such a sizing and purposely chooses the differential volume or the cavity for the reinforcing element such that it is somewhat smaller than the volume of the reinforcing element 7. It is thus possible to maintain a constant pressure on the structural component 2 being formed from the arrangement 6 of fibers and plastic material and from the reinforcing element 7 during the heating, that is, during the application of an increased temperature, and above all also during the cooling, that is, during the decrease in temperature. Due to manufacturing tolerances, that is, tolerances in the reinforcing element 7, and also due to different thermal expansions between the working materials and the material of the lower die 3 and the core 11, this pressure can, in an unfavorable case, be lost or decrease so markedly that the desired quality of the structural component 2 can no longer be guaranteed.

The reinforcing element can also be embodied with the aforementioned thermoplastic material, such as polyamide. When an increased temperature and an increased pressure are applied to the arrangement 6 of fibers and plastic material via the upper die 4, which is indicated by arrows 16, then the increased temperature also propagates to the reinforcing element and causes the semi-finished product of the reinforcing element to then become liquid or flowable. Even if the reinforcing element 7 only attains a viscous or syrup-like state, it is necessary to keep the reinforcing element 7 under the pressure described above. This is achieved in that the volume of the reinforcing element 7 is, at least in segments, smaller than the corresponding differential volume between the core 11 and the lower die 3. As a result, the semi-finished product of the reinforcing element 7 is slightly "squashed" and the "squashed" semi-finished product is under a hydrostatic pressure. This has the advantage that a uniform pressure distribution can be achieved in a simple manner. The pressure can decrease slightly due to differing thermal expansion coefficients, but it does not drop to zero. The structural component 2 being produced is thus under constant pressure.

The segment-wise reduction of the differential volume can be achieved, for example, in that a distance dl between the core 11 and the opposing wall 17 of the recess is chosen such that it is somewhat smaller than the corresponding thickness of the web 8 in this region. Alternatively or additionally, it can be provided that the depth t1 of the first subregion 12 is chosen such that it is somewhat smaller than the thickness of the first leg 9. Furthermore, it can be alternatively or additionally provided that the depth 12 of the second subregion 14 is chosen such that it is somewhat smaller than the corresponding thickness of the second leg 10.

When material from the legs 9, 10 is displaced, this displaced material can flow into the first extension 13 and the second extension 15, respectively. Because the first extension 13 and the second extension 15 have a smaller cross section than the corresponding subregions 12, 14, however, a certain throttling effect occurs in this case, so that an adequate pressure can still be maintained. The throttling effect can be achieved not only by a reduction in the depth of the extensions 13, 15, but also by another cross section reduction.

Material that is displaced from the region of the web can likewise be displaced into a displacement region, which is formed, for example, by one of the extensions 13, 15 or by both extensions 13, 15. However, this material must then pass by the legs 9, 10, which in turn is only possible against an increased resistance.

The application of an increased pressure and an increased temperature preferably occurs via an oil which is introduced in an oil pressure chamber in the upper die 4. The oil pressure chamber is separated from the arrangement 6 of fibers and plastic material by a membrane that is not illustrated in greater detail. The oil can, for example, have a temperature in the range of 350° C. to 410° C. when the increased temperature is desired. After the pressing, that is, after the application of pressure, a decrease in temperature to approximately 30° C. can occur.

The membrane can be relatively smooth on the side facing the arrangement 6, that is, it can have an $R_z$ value of less than 0.1 µm, so that an extremely smooth surface of the structural component 2 results.

The pressure curve and the temperature curve during the application to the arrangement of fibers and plastic material in the mold 1 should rise in as parallel a manner as possible, and should fall again in as parallel a manner as possible.

The invention claimed is:

1. A method for producing a structural component in a mold comprising at least one recess, comprising:
    laying a reinforcing element and a core in the at least one recess;
    laying an arrangement of fibers and plastic material in the mold; and
    subjecting the laid arrangement of fibers and plastic to an increased pressure and an increased temperature,
    wherein a differential volume between the at least one recess and the core, at least in a predetermined region, is chosen to be smaller by a predetermined amount than a predetermined segment of the reinforcing element arranged in the predetermined region to maintain a pressure on the reinforcing element,
    wherein the increased pressure is applied by a membrane which delimits an oil pressure chamber,
    wherein the reinforcing element becomes soft and attains a viscous, syrup-like state from the increased temperature, and
    wherein the increased temperature is achieved by feeding oil into the oil pressure chamber at an increased temperature in a range of 350° C. to 410° C.

2. The method according to claim 1, wherein the differential volume comprises at least one displacement region outside of the predetermined segment.

3. The method according to claim 2, wherein at least one displacement region is arranged on a side of the reinforcing element that faces away from the arrangement of fibers and plastic material.

4. The method according to claim 2, wherein the displacement region is connected to the predetermined segment via a throttle point.

5. The method according to claim 1, wherein the reinforcing element has a height, and the recess has a depth that is smaller than the height.

6. The method according to claim 1, wherein the reinforcing element comprises a web protruding away from the arrangement of fibers and plastic material, and a distance of the differential volume between the core and a wall of the recess in a region of the web is smaller than a thickness of the web to exert the pressure on the web.

7. The method according to claim 1, wherein the reinforcing element comprises at least a first leg that bears against the arrangement of fibers and plastic material, wherein the recess has a first subregion for accommodating the first leg and the first subregion has a depth that is smaller than a thickness of the first leg.

8. The method according to claim 7, wherein the first subregion comprises a first extension in a direction parallel to the arrangement of fibers and plastic material, the first extension extends a length of the first subregion beyond the length of the first leg, wherein the first extension has a depth that is smaller than the depth of the first subregion outside of the extension.

9. The method according to claim 7, wherein the reinforcing element comprises a second leg at an end facing away from the first leg, wherein the recess comprises a second subregion for accommodating the second leg and the second subregion has a depth that is smaller than a thickness of the second leg.

10. The method according to claim 9, wherein the second subregion comprises a second extension in a direction parallel to the arrangement of fibers and plastic material, the second extension extends a length of the second subregion beyond the length of the second leg, wherein the second extension has a depth that is smaller than a depth of the second subregion outside of the extension.

11. The method according to claim 1, wherein the structural component is produced for an aircraft, ground vehicle, or watercraft, or for a rotor blade of a wind turbine.

12. The method according to claim 1, wherein the pressure on the reinforcing element is maintained during a cooling phase in which the increased temperature is decreased.

13. The method according to claim 1, wherein, after subjecting the laid arrangement of fibers and plastic to an increased pressure and an increased temperature, the increased temperature is lowered by cooling the oil to a temperature range of 20° C. to 40° C.

* * * * *